Patented Jan. 21, 1947

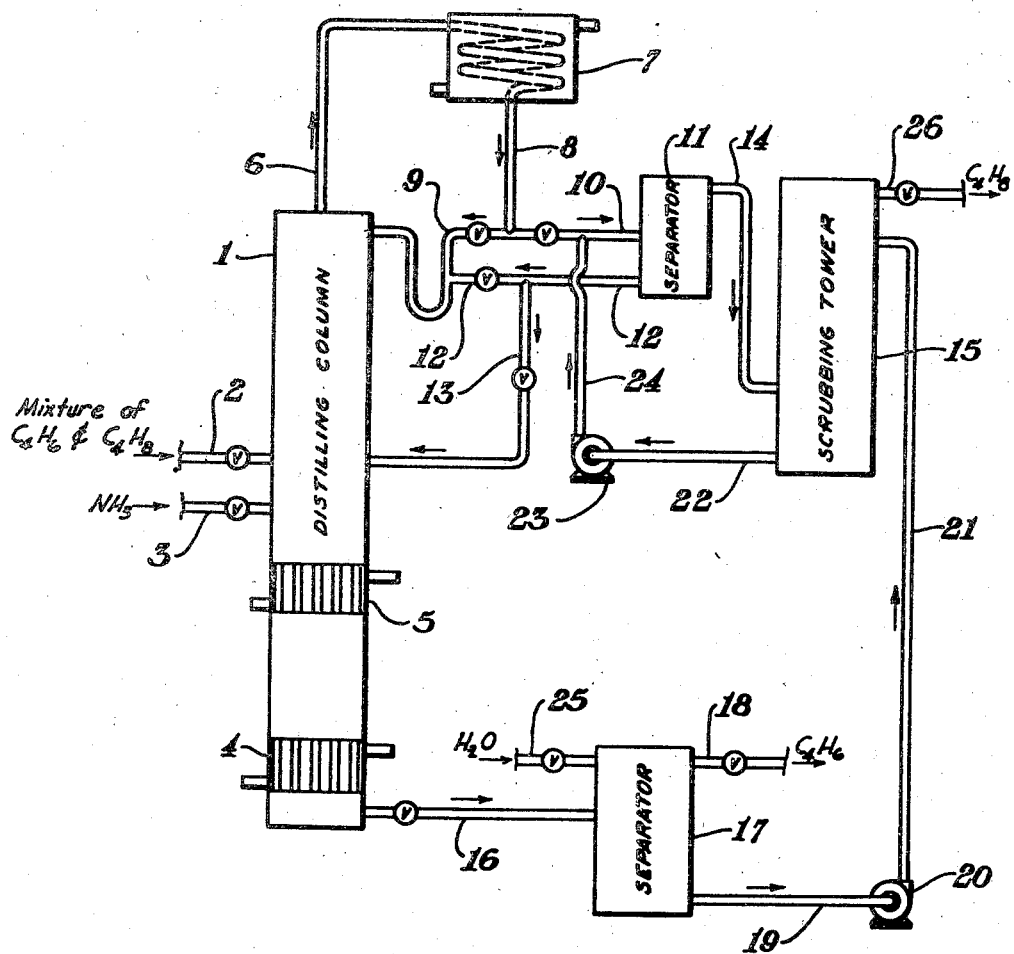

2,414,761

UNITED STATES PATENT OFFICE 2,414,761

SEPARATION OF HYDROCARBONS HAVING DIFFERENT DEGREES OF SATURATION

Howard S. Nutting and Lee H. Horsley, Midland, Mich., assignors to The Dow Chemical Company, Midland, Mich., a corporation of Michigan Application July 31, 1942, Serial No. 452,992

13 Claims. (Cl. 202—42)

This invention concerns an improved method of separating from hydrocarbon mixtures low boiling aliphatic hydrocarbons which normally tend to distill together but which are of different degrees of saturation. It pertains especially to a method for separating from one another such aliphatic hydrocarbons containing from 3 to 6 carbon atoms in the molecule and having the respective empirical formulas $C_nH_{2n}$ and $C_nH_{2n-2}$, and it particularly concerns the separation of butylenes and butadiene-1.3 from mixtures thereof.

Deanesly, in United States Patent 1,866,800, shows that a liquefied mixture of a saturated paraffinic hydrocarbon and a corresponding olefine, e. g. a mixture of butane and butylene, may be separated into its components by fractionally distilling the mixture in the presence of liquid anhydrous ammonia to obtain a distillate consisting largely of the paraffinic hydrocarbon, e. g. butane, and ammonia, while continuously returning either a portion of the distillate or the anhydrous ammonia layer of the distillate as reflux to the upper portion of the distilling column. A mixture consisting largely of ammonia and the olefine, e. g. butylene, is obtained as the residue from the distillation. He teaches that the liquid anhydrous ammonia has a greater solvent action for butylenes than for butane and as a consequence that it lowers the vapor pressure of butylenes to greater extent than that of butane and thus permits separation of the hydrocarbons.

The present application is a continuation-in-part of our copending applications, Serial No. 330,205, filed April 17, 1940, and issued March 13, 1945, as Patent No. 2,371,350, and Serial No. 287,218, filed July 29, 1939, which application Serial No. 287,218 is in turn a continuation-in-part of an earlier application, Serial No. 199,600, filed April 2, 1938. In said copending application, Serial No. 287,218, we have disclosed that aliphatic hydrocarbons containing less than 7 carbon atoms in the molecule (with the possible exception of certain of such acetylenic hydrocarbons) form minimum azeotropes with ammonia, i. e. azeotropes which are of lower boiling point than that of any individual component. It is also disclosed that such hydrocarbons having different degrees of saturation but close to the same boiling point, e. g. butylene and butadiene, form azeotropes with ammonia which may be separated by fractional distillation. The distillation is usually carried out at super-atmospheric pressure, e. g. at pressures between 100 and 440 pounds per square inch gauge, although it may be carried out successfully at atmospheric pressure. The proportion of ammonia may be varied widely, provided sufficient ammonia is present at all times to distill in azeotropic admixture with the more nearly saturated hydrocarbon. In practice the proportion of ammonia is preferably restricted to approximately that required to distill together with the more saturated hydrocarbon, since the fractionation appears to occur most efficiently when this is done and the residual less saturated hydrocarbon is obtained directly in a form nearly free of ammonia.

Said copending application, Serial No. 287,218 is directed particularly to the separation in concentrated or purified form of such unsaturated hydrocarbons having the respective empirical formulas $C_nH_{2n}$ and $C_nH_{2n-2}$ from more complex hydrocarbon mixtures, e. g. cracked oil gas, by repeated fractional distillations of the hydrocarbon mixtures, alternately in the presence and in the absence of ammonia. The application contains no statement or restriction as to the concentration of the ammonia to be added to the hydrocarbon mixtures, although in certain of the examples liquid ammonia is used.

In the aforementioned copending application, Serial No. 330,205, we have disclosed that the separation of close-boiling hydrocarbons of different degrees of saturation by fractional distillation in the presence of ammonia may most advantageously be accomplished by employing the ammonia in approximately the proportion required to distill as an azeotrope together with the more nearly saturated hydrocarbon and by supplying less than half of the heat required for the distillation by means of a heater situated at the lower end of the distilling column and supplying the major portion of the heat at a point part way up the column. It is shown that by operating in this particular manner, the major portion of the heat may be supplied directly to the azeotrope of ammonia and the more nearly saturated hydrocarbon at a lower temperature (and hence, at lower cost) than when all of the heat is provided near the lower end of the column, and that the productive capacity of the column may be increased over that which it possesses when the heat for the distillation is all supplied at the lower end thereof.

The present invention concerns an improved method of carrying out azeotropic distillations of low boiling aliphatic hydrocarbons together with ammonia such as the azeotropic distillations described in the above-discussed copending application, Serial No. 287,218. We have found that aqueous ammonia, i. e. ammonia diluted with 0.5 per cent or more of water, may advantageously be employed in carrying out such azeotropic distillation. The fractions of distillate obtained are substantially the same, regardless of whether aqueous or anhydrous ammonia is employed. The water is largely retained in the still and/or column and may be withdrawn continuously or intermittently from the still bottoms. However, the water may be employed in such manner as to serve several important functions in the process. It serves to keep the distilling apparatus, particularly the heating unit or calandria, free of solid or tarry deposits which may accumulate when anhydrous ammonia is employed in such distillation and it thereby serves to maintain a high heating efficiency and to avoid the necessity for periodic interruption of the process and cleaning of the apparatus. The deposit that gradually accumulates when anhydrous ammonia is used in carrying out such distillation usually comprises polymerized diolefines and frequently also contains carbamates formed by reaction of the ammonia with the small portion of carbon dioxide which almost invariably occurs in the commercially available hydrocarbon mixtures subjected to the treatment. As just mentioned, the presence of water in the distilling mixture prevents appreciable accumulation of deposits on the inner walls of the apparatus and it appears to prevent, or at least curtail, the formation of solids or tars in the distilling mixture.

The water may be recycled or fed into the process in such manner as to avoid the extensive cooling or refrigeration otherwise required in certain steps of the process. The azeotropic mixtures of ammonia and aliphatic hydrocarbons which are collected as distillates in the process may in all instances be caused to separate into an ammonia layer and a hydrocarbon layer by cooling, but strong cooling or refrigeration is required in most instances to effect such separation. For instance, the "critical solution temperature," i. e. the highest temperature at which any of the solutions of liquid anhydrous ammonia and a given hydrocarbon will separate into distinct phases of ammonia and the hydrocarbon, is: $-8°$ C. for the system of ammonia and propylene; below $-78°$ C. for the system of ammonia and methyl-acetylene; $10°$ C. for ammonia and butylene-1; $-31°$ C. for ammonia and butadiene-1.3; below $-78°$ C. for ammonia and vinyl-acetylene; and $22°$ C. for the system ammonia and amylene-1. With regard to any of these systems, the hydrocarbon is appreciably soluble in ammonia at temperatures below the critical solution temperature, and vice versa. Even a solution of anhydrous ammonia and a paraffinic hydrocarbon such as butane must be strongly cooled in order to effect rapid and substantially complete separation of the ammonia and the hydrocarbon as distinct phases, e. g. butane is appreciably soluble in anhydrous ammonia at $25°$–$30°$ C.

We have found that by adding the water which is desired in the distillation to any such ammonia and hydrocarbon fraction of the distillate, separation of the ammonia and the hydrocarbon into distinct layers may be obtained without refrigeration. The proportion of water required to effect the separation depends, of course, upon the kind and proportion of hydrocarbon in the fraction under treatment and upon the temperature at which the treatment is carried out. The addition of from 5 to 15 per cent by weight of water is usually sufficient to cause separation of the ammonia and the hydrocarbon into distinct phases and in some instances only a trace of water is required to effect the separation. The water may be used in as large a proportion as desired. During such treatment of the ammoniacal distillate with water, heat is generated and the mixture is preferably maintained at a temperature and pressure such as to avoid vaporization. The added water forms a solution with the ammonia, thus forming the ammonia layer of the mixture, and this layer is, of course, separated from the hydrocarbon layer and returned to the distillation.

We have further found that the water which accumulates at the bottom of the column during the azeotropic distillation may advantageously be withdrawn continuously and be used to scrub any residual ammonia from the distilled hydrocarbon product after separation of the latter from the ammonia layer of the distillate. The saving in ammonia, otherwise lost from the system, which is achieved by this scrubbing operation is considerable and greatly reduces the cost of the distillation. After employment in such scrubbing operation, the water, which contains some dissolved ammonia, may be mixed with freshly accumulated distillate to cause separation of the latter into a hydrocarbon layer and an aqueous ammonia layer. The latter is returned either as feed or as reflux material to the distilling column. By operating in such manner the same water is continuously recycled in the process and fresh water need not be added except as required to replace any lost from the system. As hereinbefore mentioned, the water thus continuously recycled in the process serves the three distinct functions of: (1) preventing the accumulation of deposits within the distillation apparatus, particularly on the heating elements thereof, whereby it renders possible efficient heating of the distilling mixture over long periods of time; (2) causing separation of the solution of ammonia and hydrocarbon collected as distillate into a hydrocarbon layer and an ammonia layer at temperatures far higher than would otherwise be required, whereby refrigeration of the distillate is avoided; and (3) scrubbing residual ammonia from the distilled hydrocarbon product.

We have also found that in carrying out such fractional distillation of close-boiling hydrocarbons of different degrees of saturation in the presence of ammonia and water, the proportion of ammonia may advantageously be restricted to approximately that required to distill together with the more nearly saturated hydrocarbon or hydrocarbons and the major portion of the heat required for the distillation may advantageously be supplied by means of a calandria or other heater situated part way up the column, in which case only a minor part of the heat is supplied at a higher temperature to the residual mixture of water and the less saturated hydrocarbon or hydrocarbons in the lower end of the distilling column. The advantages of operating in this particular manner are numerous, e. g. the water, as hereinbefore mentioned, serves to maintain the distilling apparatus, particularly the heaters, free of solid or tarry deposits; the major portion of the heat is supplied part way up the column directly to the ammonia-hydrocarbon azeotrope to be distilled, so that heating of the residual less saturated and least stable hydrocarbon is curtailed; the less saturated hydrocarbon may be obtained directly in a form nearly free of ammonia and the more nearly saturated hydrocarbon; and the productive capacity of the distilling column is increased over that which it possesses when all of the heat for the distillation is supplied at the lower end of the column.

It may be explained that the increase in productive capacity of the column thus attained is due to the fact that the ammonia-hydrocarbon systems dealt with have certain unusual characteristics; viz., the azeotropes of ammonia and the hydrocarbons, although of lower boiling point than the hydrocarbons alone, have far higher heats of vaporization than do the hydrocarbons. Accordingly, the amount of such azeotrope vaporized per unit input of heat (e. g. by means of a heater situated part way up the column) is smaller than the amount of hydrocarbon vaporized by introducing the same amount of heat directly to the hydrocarbon and water mixture at the bottom of the column. The reduction in the amount of material vaporized per unit input of heat results, of course, in an increase in the productive capacity of the column.

The accompanying drawing is a diagrammatic sketch showing one of the various arrangements of apparatus which may be employed in carrying out the process in continuous manner. In the drawing, the numeral 1 designates a distilling column which is provided near its mid-section with an inlet 2 for hydrocarbons and another inlet 3 for ammonia and at its lower end with a heater 4 and an outlet line 16. At a point below the inlets 2 and 3 but part way up the column, the latter may advantageously be provided, as shown, with the heater 5, although such heater is not required. The heaters 4 and 5 may be calandrias, as indicated, or other conventional heaters, e. g. boilers, or electric heaters, etc. At the top of column 1 is a vapor line 6 leading to a condenser 7. Line 8 leading from the condenser branches into two valved lines 9 and 10. Line 9 is a reflux line which connects with column 1 near the top of the latter. Line 10 connects with a chamber 11 which may be a conventional settling chamber or a continuous separator as desired. A valved line 12 leads from the lower end of chamber 11 and connects with the reflux line 9. Line 12 is provided with a valved branch line 13 which connects with column 1 near the mid-section of the latter. A line 14 leads from the upper portion of chamber 11 and connects with a scrubbing tower 15 near the lower end of the latter. Tower 15 is provided toward its upper end with an inlet line 21 and with a valved outlet 26. A line 22 leads from the lower end of tower 15 to a pump 23. The latter is connected by line 24 with line 10. The valved line 16, leading from the lower end of column 1 connects with a chamber 17, which may be a settling chamber or a continuous separator. Near its upper end chamber 17 is provided with a valved inlet 25 and a valved outlet 18. A line 19 leads from the lower end of chamber 17 to a pump 20 which is connected by line 21 with tower 15 near the upper end of the latter.

In employing the apparatus shown in the drawing to separate into its components a mixture of butylene and butadiene-1.3, the hydrocarbon mixture is introduced into column 1 through inlet 2 while under a pressure sufficient to liquefy the same. Liquid ammonia, which may be anhydrous or may be an aqueous ammonia solution of any desired concentration, is introduced through inlet 3. The ammonia is usually introduced in a liquefied form containing from 5 to 15 per cent by weight of water and in amount sufficient to distill in azeotropic admixture with the butylene. A larger amount of ammonia, e. g. sufficient to form azeotropes with both the butylene and the butadiene or even an excess over this amount, may be introduced if desired.

While introducing the above-mentioned starting materials, the distilling mixture is heated, e. g. by passage of steam or other heating fluid through the principal chambers of calandrias 4 and 5. As hereinbefore mentioned, a major portion of the heat required for the distillation is preferably supplied by means of the heater 5, but if desired, all of the heat may be supplied by heater 4. The pressure on the distilling system determines the temperature at which the distillation is carried out and may be varied between wide limits. The distillation is usually carried out at pressures between 100 and 440, preferably between 150 and 300, pounds per square inch gauge, but it may be carried out at lower pressures, e. g. at atmospheric pressure, if desired. Introduction of the mixture of butylene and butadiene to the distilling system may be continued for as long a period as desired, e. g. in practice the process has been operated continuously without interruption over a period of several months. However, ammonia is recycled continuously in the system; hence, the introduction of ammonia may be discontinued when sufficient ammonia to effect the azeotropic distillation has been fed into the system.

The distilling column 1, is operated so as to distill off the butylene together with at least a portion of the ammonia and leave the butadiene in the residue. All except possibly a minor portion of the water and also any excess of ammonia over that required to distill together with the butylene remain, of course, in the residue. In practice, the fractionation may be carried out most efficiently by restricting the proportion of ammonia in the distilling column to approximately that required to distill together with the butylene. When operating in this preferred manner, the residue consists substantially of butadiene and water.

The vapors of butylene and ammonia flow through line 6 to the condenser 7. A portion of the condensate is returned continuously through lines 8 and 9 to the top of column 1 for purpose of reflux. The remainder of the condensate flows from line 8 into line 10 where it is treated with water, or with a dilute aqueous ammonia solution, which is introduced into line 10 from line 24. The proportion of water thus added to the distillate usually corresponds to between 5 and 15 per cent of the weight of the latter, but the water may be added in smaller or in much larger proportion if desired.

The resultant mixture flows to chamber 11 where it separates into an upper layer of butylene and a lower layer of aqueous ammonia. The latter is returned either through lines 12 and 9 to the upper portion of column 1 as reflux material or through line 12 and the branch line 13 as feed near the mid-section of column 1. In practice, the return flow of the aqueous ammonia layer may be split so that a portion thereof is fed into the top of column 1 as reflux material and a portion is returned to the mid-section of the column.

The upper butylene layer of the distillate flows through line 14 into the lower section of scrubbing tower 15 where it is scrubbed with water to remove and recover any residual ammonia therefrom. The purified butylene leaves the system through outlet 26. The scrubbing water flows through line 22, pump 23, and line 24, to line 10, where it serves to dilute the distillate and cause separation of the same into distinct phases.

When the process is first placed in operation using anhydrous ammonia as a feed to the column, the still residue may consist substantially of butadiene alone or of a mixture of butadiene and ammonia, but after operating for some time the residue also contains water. In any case it is passed through line 16 to chamber 17 where it is treated, if necessary, with water (introduced through inlet 25) to remove any ammonia from the butadiene. As hereinbefore mentioned, the water is recycled continuously in the system so that after operation of the process for a short time the proportion of water required for separation of the ammonia from the butadiene accumulates together with the latter in the still residue, in which case water need not be introduced through inlet 25. The lower aqueous layer in chamber 17 (which layer contains any ammonia present) is passed through line 19, pump 20, and line 21 to the upper portion of tower 15, where it is utilized, as hereinbefore mentioned, to scrub any ammonia from the butylene product. The upper layer of purified butadiene is withdrawn from chamber 17 through outlet 18.

Other hydrocarbon mixtures may be distilled together with ammonia as just described to separate from one another the hydrocarbons of different degrees of saturation which normally distill together. For instance, if the mixture of butylene and butadiene introduced through inlet 2 also contains ethyl-acetylene and/or vinyl acetylene, the acetylenic hydrocarbons accompany the butadiene and are withdrawn together with the latter through outlet 18. The butadiene may thereafter be separated from the acetylenic hydrocarbons by careful fractional distillation in the absence of ammonia. When the mixture of butylene and butadiene used as a starting material also contains butane, the distillation may, if desired, be carried out carefully to obtain the azeotrope of ammonia and butane as a first, or more volatile, fraction and the residual mixture may be redistilled to obtain the azeotrope of ammonia and butylene as a second fraction. However, in practice it is usually most convenient to carry out a single distillation and to collect these two azeotropes together as a single fraction. The distillation in the presence of aqueous ammonia may, of course, be applied with advantage in separating a mixture of a paraffinic hydrocarbon and the corresponding olefine, e. g. a mixture of butane and butylene, into its components. The process as hereinbefore described may also be applied in separating from one another the hydrocarbons of close to the same boiling point but having different degrees of saturation which are contained in other low-boiling hydrocarbon mixtures. For instance, it may be applied in separating propane from propylene; in separating propylene from propadiene; in separating pentane from amylene; in separating amylene from pentadiene; or in separating a hexylene from a hexadiene; etc.

The continuous method and the apparatus hereinbefore described may be modified or altered without departing from the invention. For instance, instead of introducing the water to the distilling system through inlet 25, it may be introduced at any of a number of other suitable points in the system, e. g. alone or together with the ammonia through inlet 3. Also, the heater 5 in column 1 is not essential and may be omitted. Furthermore, the invention may, if desired, be carried out in batchwise manner using a pot still provided with an efficient distilling column. Other modifications which may be made in the process will be apparent to those skilled in the art.

The following example describes comparative runs, both of which were carried out in continuous manner on a manufacturing scale. The runs differed principally in that the first run was carried out using anhydrous ammonia as the entraining agent and without the presence of water in the distilling system, whereas the second run was carried out in the presence of water as hereinbefore described.

EXAMPLE

Run 1

A liquefied hydrocarbon mixture containing approximately 49.5 per cent by weight of butylene, 49.5 per cent of butadiene-1,3, about 1 per cent of other hydrocarbons (principally ethyl-acetylene and vinyl-acetylene) and 0.05 per cent of a polymerization inhibitor (consisting of a mixture of phenol and tertiary-butyl-phenol) was fed at a rate of approximately 500 parts by weight per hour into a continuously operating still. Liquid anhydrous ammonia was at the same time introduced into the still, i. e. initially as feedstock and subsequently as recovered and recycled material, at a rate of approximately 425 parts per hour. Once the distilling system was in balance and sufficient ammonia had been added to distill together with the butylene, the introduction of ammonia from a source outside of the distilling system was discontinued except for periodic introduction of sufficient ammonia to make up for losses from the system. The ammonia thus added periodically as make up material during two months of continuous operation corresponded to 0.04 pound of ammonia per pound of purified butadiene product. Heat was supplied by the passage of steam through a calandria at the lower end of the column and also through another calandria part way up the column. The distillation was carried out at a pressure of 200 pounds per square inch, gauge, and at a still-head temperature of about 30° C., whereby a solution of ammonia and butylene was obtained as the distillate. The latter was cooled by refrigeration to −30° C., whereupon it separated into an ammonia layer containing only a small proportion of dissolved butylene and a butylene layer containing a small amount of ammonia. The layers were separated in a continuous separator and the ammonia was returned to the distillation. The butylene layer was scrubbed with water to remove the small amount of dissolved ammonia therefrom, whereby butylene of approximately 98 per cent purity was obtained. The still residue, consisting principally of butadiene together with the acetylenic hydrocarbons and a trace of ammonia was washed with water and then treated to remove the acetylenic hydrocarbons. The butadiene thus obtained was of approximately 98 per cent purity. The foregoing operations were carried out continuously over a long period of time. At the start of the distillation, steam was passed through the calandria at the lower end of the column under a pressure of 3 pounds per square inch gauge. However, as the distillation was continued, the inner surfaces of the tubes of this calandria gradually became coated with a solid deposit, with the result that heat transfer became less efficient and the pressure on the steam passing through the calandria had to be increased in order to supply the necessary heat to the distilling mixture. By the end of two months of continuous operation, the steam pressure in the lower calandria had been increased from an initial value of 3 pounds per square inch to 10 pounds per square inch. The distillation was then interrupted and the calandria was cleaned. A considerable amount of film-like deposit in the form of a nearly solid tar was removed. Upon resuming operation of the still, the distillation at first occurred smoothly at a steam pressure in the lower calandria of 3 pounds, but it was again necessary gradually to increase the steam pressure in said calandria in order to continue operation of the still. After the pressure of the steam had been increased to 7 pounds per square inch, operation was continued as before, except that water also was fed into the still at a rate of 64 parts by weight per hour. The steam pressure in the lower calandria required for continuance of the distillation thereafter gradually became less and ultimately was only 3 pounds per square inch, indicating that the calandria had been cleaned during operation in the presence of the water.

*Run 2*

A liquefied hydrocarbon mixture having the composition given in Run 1 was fed continuously into a distilling column at a rate of about 500 parts by weight per hour and liquid anhydrous ammonia was initially fed into the column at a rate of approximately 425 parts per hour. The distilling column was the same as that employed in Run 1 and it was operated at the temperatures and pressures given in said run. However, the still residue, consisting principally of butadiene was washed, as it flowed from the column, with water which was introduced into the system at a rate of about 64 parts by weight per hour. The butadiene, thus washed to remove any dissolved ammonia, was withdrawn from the system and was thereafter treated to remove the small portion of acetylenic hydrocarbons which accompanied the same. Butadiene of 98 per cent purity was obtained. The water which had been used to wash the still residue was circulated to a scrubbing tower where it was employed to scrub any dissolved ammonia from the butylene product. The water was next fed into admixture with the freshly accumulated distillate, whereupon it caused separation of the latter into an upper layer of butylene and a lower layer of aqueous ammonia while at a temperature of about 25° C. The layers were separated, the butylene layer being forwarded to the above-mentioned scrubbing tower where it was scrubbed, while in liquefied form, with water to remove any dissolved ammonia and was then withdrawn from the system. Butylene of approximately 98 per cent purity was obtained. The aqueous ammonia layer obtained by treatment of the distillate with the water was returned as reflux material to the distillation. The introduction of ammonia and water to the system was continued only until the system had been brought into balance with respect to these ingredients, i. e. until the rates of return of water and ammonia to the distilling column by recycling corresponded to those at which they had initially been introduced from outside sources. Thereafter the feed to the distillation system from an outside source consisted only of the mixture of hydrocarbons to be separated, except for occasional introduction of small amounts of ammonia and water to replace losses from the system. The ammonia thus added as make up material over a period of one month of continuous operation was measured and amounted to only 0.02 pound of ammonia per pound of purified butadiene. Operation as just described was, however, carried out continuously over a period of several months. Throughout the entire period, steam was fed into the calandria at the lower end of the column under a pressure of 3 pounds per square inch, gauge. Heat transfer through the walls of the calandria occurred efficiently throughout the period of operation and the calandria remained clean and substantially free of tar or other deposits.

Other modes of applying the principle of the invention may be employed instead of those explained, change being made as regards the method herein disclosed, provided the step or steps stated by any of the following claims or the equivalent of such stated step or steps be employed.

We therefore particularly point out and distinctly claim as our invention:

1. In a method for separating from one another two aliphatic hydrocarbons containing more than 2 and less than 7 carbon atoms in the molecule and which tend to distill together but which have different degrees of saturation, the steps of fractionally distilling a hydrocarbon mixture comprising said hydrocarbons in the presence of an appreciable amount of water and at least sufficient ammonia to form a relatively low-boiling azeotrope of ammonia and the more nearly saturated of said two aliphatic hydrocarbons, which azeotrope distills from the mixture, the fractional distillation in the presence of the water and ammonia being continued until a substantial portion of the more nearly saturated of said two hydrocarbons has been separated from the less saturated hydrocarbon to leave the latter and the water in the residue, the water serving to prevent deposition of solids on the surfaces of the distillation apparatus and thereby to facilitate efficient operation of the process.

2. In a method wherein aliphatic hydrocarbons which tend to distill together and which are of different degrees of saturation and contain more than 2 and less than 7 carbon atoms in the molecule are separated from one another by fractional distillation at superatmospheric pressure in the presence of at least sufficient ammonia to form an azeotrope with the more nearly saturated of said hydrocarbons, the step of carrying the distillation out in the presence of an appreciable amount of water, whereby appreciable accumulation of solids on inner surfaces of the apparatus is prevented.

3. In a continuous method wherein aliphatic hydrocarbons of different degrees of saturation and containing the same number of carbon atoms in the molecule, which number is more than 2 and less than 7, are separated from one another by fractional distillation at superatmospheric pressure in the presence of sufficient ammonia to distill off the more nearly saturated hydrocarbon in azeotropic mixture with ammonia and leave the less saturated hydrocarbon in the residue, the steps which consist in carrying the distillation out in the presence of an appreciable amount of water, the latter serving to prevent the deposition of solids in appreciable amount on the inner surfaces of the still and also to absorb any ammonia retained in the still residue, continuously withdrawing the water-containing residue from a lower section of the distilling column, separating the aqueous and hydrocarbon layers of the mixture thus withdrawn from the column, and while continuing said operations treating the solution of ammonia and the more saturated hydrocarbon obtained as the distillate with sufficient water to cause the same to separate into a hydrocarbon layer and an aqueous ammonia layer, continuously returning the latter to the distillation and scrubbing the hydrocarbon layer with the aqueous layer separated from the still residue to extract any dissolved ammonia therefrom, and thereafter admixing the scrubbing water with distillate, the water thus admixed with the distillate serving as that required to cause separation of the distillate into layers.

4. A method as described in claim 2 wherein the empirical formulas of the more nearly saturated and the less saturated hydrocarbons are $C_nH_{2n}$ and $C_nH_{2n-2}$, respectively.

5. A method as described in claim 2 wherein the more nearly saturated hydrocarbon is an olefine, the less saturated hydrocarbon is a conjugated diolefine, and the distillation is carried out at a pressure between 100 and 440 pounds per square inch.

6. A method as described in claim 2 wherein the more nearly saturated hydrocarbon is a butylene, the less saturated hydrocarbon is butadiene, and the distillation is carried out at a pressure between 100 and 440 pounds per square inch.

7. A method as described in claim 3 wherein the more nearly saturated hydrocarbon and the less saturated hydrocarbon have the empirical formulas $C_nH_{2n}$ and $C_nH_{2n-2}$, respectively.

8. A method as described in claim 3 wherein the more nearly saturated hydrocarbon is an olefine and the less saturated hydrocarbon is a conjugated diolefine.

9. A method as described in claim 3 wherein the more nearly saturated hydrocarbon is a butylene and the less saturated hydrocarbon is butadiene-1.3.

10. A method as described in claim 3, wherein the more nearly saturated hydrocarbon is a normal butylene, the less saturated hydrocarbon is butadiene-1.3, and the distillation is carried out at a pressure between 100 and 440 pounds per square inch.

11. In a method wherein aliphatic hydrocarbons which tend to distill together and which are of different degrees of saturation and contain more than 2 and less than 7 carbon atoms in the molecule are separated from one another by fractional distillation in the presence of only sufficient ammonia to azeotrope with a portion of the hydrocarbons present, the steps which consist in carrying the distillation out in the presence of water in an appreciable amount not exceeding 15 per cent of the combined weight of the ammonia and water while introducing a minor part of the heat required for the distillation to the mixture of hydrocarbon and water in the lower portion of the still and introducing the major part of the heat directly to the mixture rich in ammonia and hydrocarbon thereabove.

12. A method as described in claim 11 wherein the more nearly saturated hydrocarbon has the empirical formula $C_nH_{2n}$ and the less saturated hydrocarbon has the empirical formula $C_nH_{2n-2}$.

13. A method as described in claim 11 wherein the hydrocarbons to be separated by the distillation are an olefine and a conjugated diolefine having the same number of carbon atoms in the molecule as the olefine, a hydrocarbon mixture comprising said hydrocarbons is fed in substantially continuous flow into the distilling system, the proportion of water in the distilling system corresponds to between about 5 and about 15 per cent of the combined weight of the ammonia and water, the still residue, comprising the diolefine and water is withdrawn continuously from a lower portion of the still and the aqueous and organic layers thereof are separated, the distillate, comprising the olefine and ammonia, is admixed with sufficient water to cause formation of a hydrocarbon layer and an aqueous ammonia layer, the layers thus formed are separated and the hydrocarbon layer of the distillate is scrubbed with water to remove any dissolved ammonia therefrom, and wherein the water which is separated from the still residue is that employed to scrub dissolved ammonia from the hydrocarbon layer of the distillate, the resultant scrubbing water is the water which is admixed with the distillate to cause separation of the latter into the hydrocarbon layer and the aqueous ammonia layer, and the latter is separated from the hydrocarbon layer of the distillate and is returned continuously to the distillation.

HOWARD S. NUTTING.
LEE H. HORSLEY.